United States Patent
Ahmad et al.

(10) Patent No.: US 12,470,901 B2
(45) Date of Patent: Nov. 11, 2025

(54) COOPERATIVE SENSOR SHARING

(71) Applicant: FORD GLOBAL TECHNOLOGIES, LLC, Dearborn, MI (US)

(72) Inventors: Syed Amaar Ahmad, Canton, MI (US); Jayanthi Rao, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 394 days.

(21) Appl. No.: 18/153,670

(22) Filed: Jan. 12, 2023

(65) Prior Publication Data

US 2024/0244409 A1    Jul. 18, 2024

(51) Int. Cl.
| | |
|---|---|
| H04W 4/44 | (2018.01) |
| H04W 4/38 | (2018.01) |
| H04W 28/02 | (2009.01) |
| H04W 76/10 | (2018.01) |

(52) U.S. Cl.
CPC ............... *H04W 4/44* (2018.02); *H04W 4/38* (2018.02); *H04W 28/0226* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 11,388,565 B2* | 7/2022 | Hwang | H04W 28/02 |
| 2011/0238259 A1 | 9/2011 | Bai et al. | |
| 2019/0339082 A1 | 11/2019 | Doig et al. | |
| 2020/0022159 A1* | 1/2020 | Bai | H04W 4/40 |
| 2022/0400403 A1* | 12/2022 | Vassilovski | H04W 4/38 |
| 2023/0089475 A1* | 3/2023 | Uyar | G06N 3/126 |
| | | | 455/456.3 |

OTHER PUBLICATIONS

Thandavarayan et al., "Generation of Cooperative Perception Messages for Connected and Automated Vehicles," in IEEE Transactions on Vehicular Technology, vol. 69, No. 12, pp. 16336-16341, Dec. 2020.

* cited by examiner

*Primary Examiner* — Diane L Lo
(74) *Attorney, Agent, or Firm* — Joseph Zane; BROOKS KUSHMAN P.C.

(57) ABSTRACT

A first connected message is received, by a controller of a host vehicle, from a remote vehicle via a transceiver of the host vehicle. The first connected message indicates a first object along a roadway detected by the remote vehicle. Presence of a second object along the roadway is identified using sensors of the host vehicle. A probability function is utilized to determine a result indicative of whether to send a second connected message indicating the second object. The second connected message is sent responsive to the result indicating to send the second connected message. The second connected message is suppressed responsive to the result indicating not to send the second connected message.

21 Claims, 8 Drawing Sheets

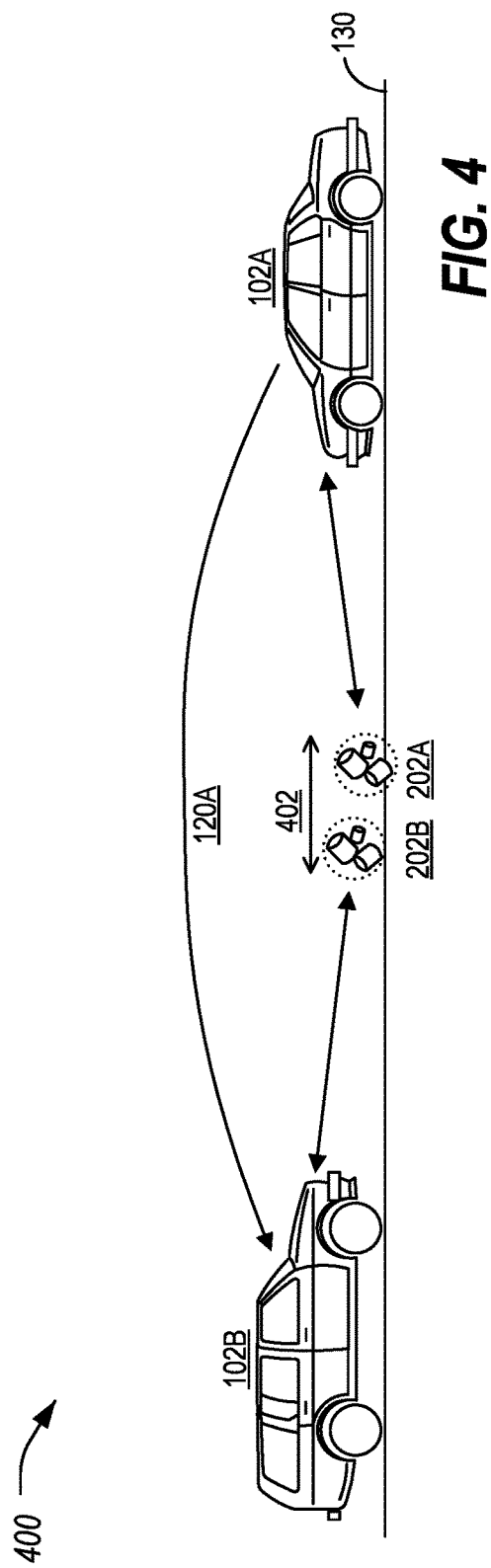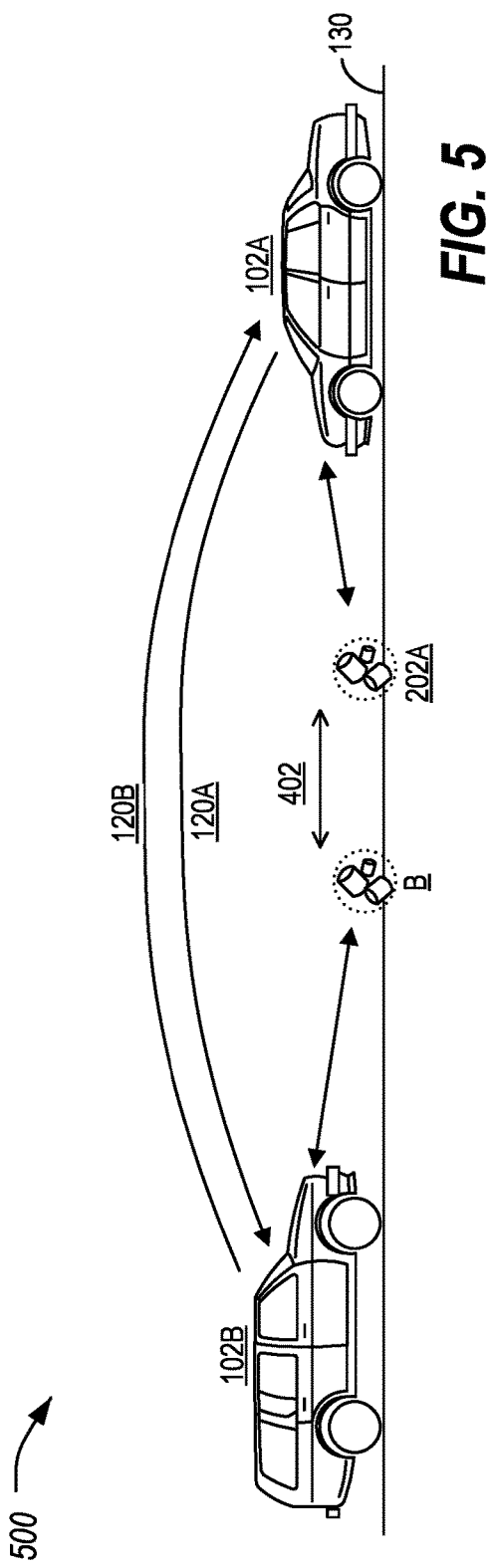

COOPERATIVE SENSOR SHARING

TECHNICAL FIELD

Aspects of the disclosure generally relate to cooperative sensor sharing between traffic participants, such as vehicles.

BACKGROUND

Vehicle-to-everything (V2X) allows vehicles to exchange information with other vehicles, as well as with infrastructure, pedestrians, networks, and other devices. Vehicle-to-infrastructure (V2I) communication enables applications to facilitate and speed up communication or transactions between vehicles and infrastructure. In a vehicle telematics system, a telematics control unit (TCU) may be used for various remote-control services, such as over the air (OTA) software download, eCall, and turn-by-turn navigation.

SUMMARY

In one or more illustrative embodiments, a system for cooperate sensor sharing includes a transceiver of a host vehicle; sensors of the host vehicle; and a controller of the host vehicle. The controller is programmed to receive a first connected message from a remote vehicle via the transceiver, the first connected message indicating a first object along a roadway detected by the remote vehicle, identify presence of a second object along the roadway using the sensors, utilize a probability function to determine a result indicative of whether to send a second connected message indicating the second object, send the second connected message responsive to the result indicating to send the second connected message, and suppress the second connected message responsive to the result indicating not to send the second connected message.

In one or more illustrative examples, a method for cooperate sensor sharing includes receiving, by a controller of a host vehicle, a first connected message from a remote vehicle via a transceiver of the host vehicle, the first connected message indicating a first object along a roadway detected by the remote vehicle; identifying presence of a second object along the roadway using sensors of the host vehicle; utilizing a probability function to determine a result indicative of whether to send a second connected message indicating the second object; sending the second connected message responsive to the result indicating to send the second connected message; and suppressing the second connected message responsive to the result indicating not to send the second connected message.

In one or more illustrative examples, a non-transitory computer-readable medium includes instructions for cooperative sensor sharing that, when executed by a controller of a host vehicle, cause the host vehicle to perform operations including to receive, by the controller, a first connected message from a remote vehicle via a transceiver of the host vehicle, the first connected message indicating a first object along a roadway detected by the remote vehicle; identify presence of a second object along the roadway using sensors of the host vehicle; utilize a probability function to determine a result indicative of whether to send a second connected message indicating the second object; send the second connected message responsive to the result indicating to send the second connected message; and suppress the second connected message responsive to the result indicating not to send the second connected message.

BRIEF DESCRIPTION OF THE DRAWINGS

FIG. 4 illustrates an example of the connected vehicle suppressing its transmission of connected messages with respect to a detected object;

FIG. 5 illustrates an example of the connected vehicle performing transmission of connected messages with respect to the detected object;

DETAILED DESCRIPTION

Figure 1:
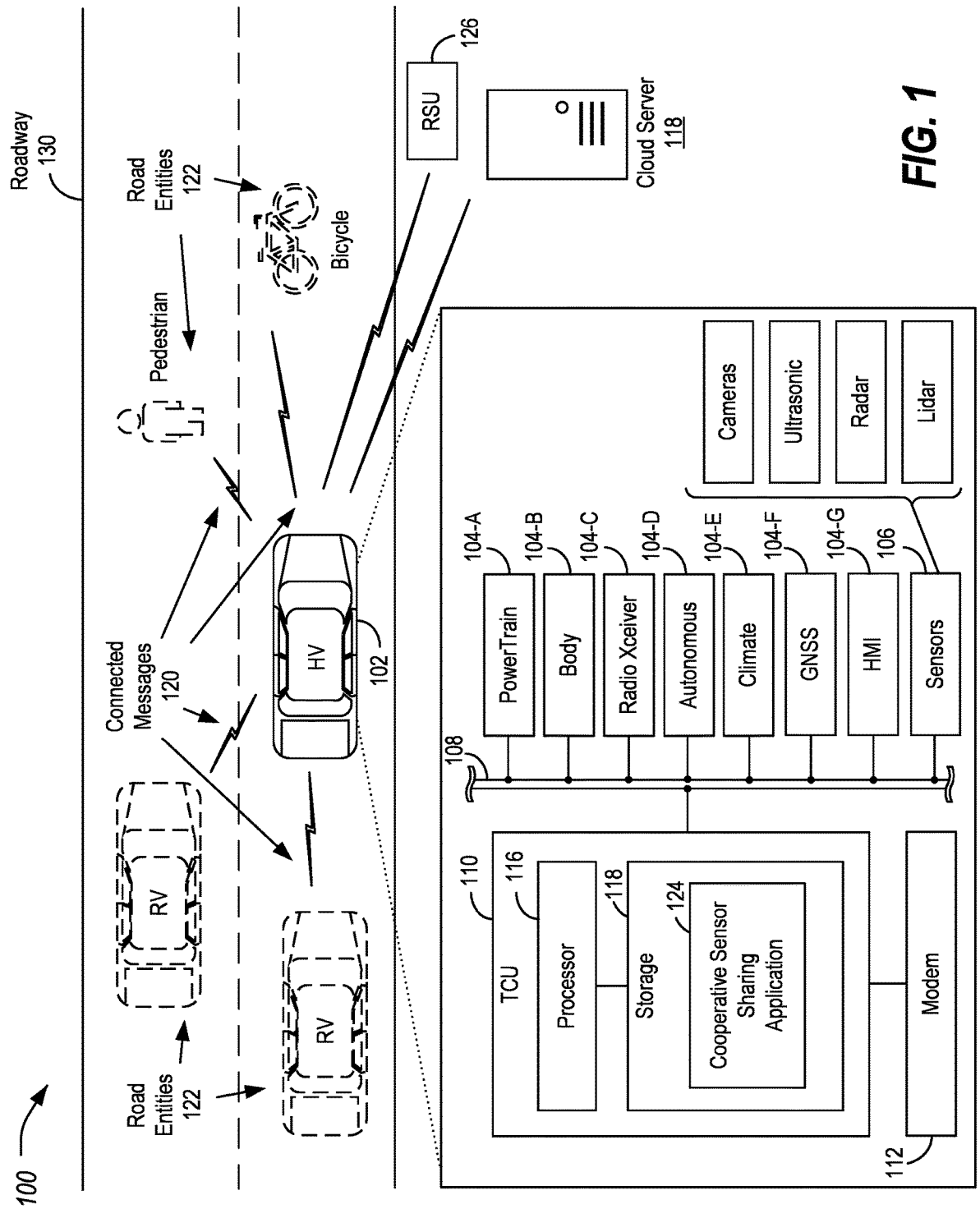
FIG. 1 illustrates an example system for performing cooperative sensor sharing between traffic participants.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Many vehicles come equipped with radar or camera sensors and cellular vehicle-to-everything (C-V2X) capability. Yet, many older vehicles are still in service that neither have the sensing capability nor any V2X equipment.

Vehicles that are equipped with C-V2X transceivers may mutually share information about road entities such as pedestrians, debris, or unequipped vehicles. This information may be detected in accordance with standards such as society of automotive engineer (SAE) J3224 messages, oftentimes referred to as Sensor Data Sharing Messages (SDSM). These messages may aid in raising V2X situation awareness for scenarios having relatively few V2X-equipped vehicles and may sustain such technology until greater integration and adoption. This sensor sharing approach; however, may not be optimized since it may create sensing information duplication and additional channel congestion.

As the number of sensing-capable vehicles proliferate, having too much duplication of information about the sensed environment may overload communications channel and/or computing resources. Further, when in a vicinity that has multiple animals, pedestrians, or non-equipped vehicles, each unique object may be detected by multiple sensing C-V2X vehicles, which each broadcast their respective information to help inform each other. Often vehicles may naively duplicate information about a commonly detected objected and share with each other when it is already recognized. Thus, cooperative sensing by multiple equipped vehicles may self-defeat the cooperative sensing technology due to either sensed information duplication or excessive channel congestion.

An enhanced cooperative sensor sharing system may be provided that applies selective handling of SDSM messages. If a host vehicle receives SDSM from another vehicle, then the host vehicle may suppress the host vehicle's own SDSM if the host vehicle perceives the same object on road. In one example, a distance overlap between a detected object and what is received in an SDSM may be compared. If the distance overlap is below a predefined threshold, then the detecting vehicle may suppress its own SDSM; otherwise, the detecting vehicle may transmit its own SDSM about the object (since this object is likely different from the objected indicated in the received SDSM). The comparison threshold may adjust based on the SDSM channel busy level or the confidence in the object measurements. When either the channel busy level and the confidence in detection is low, sending an SDSM with duplicated information about a detected object may be acceptable.

In another example, sensing vehicles may additionally or alternately cooperate about a division of sensing space to enhance detections and/or accuracy. The division of the sensing space may be based on factors such as proximity to the object and sensing envelope of the detecting vehicles. Sensing vehicles may also assign weights to the detections of an object as human, animal, vehicle, or unknown, e.g., adding up to 100%. Thus, a connected vehicle with onboard sensors may transmit BSMs as well as SDSMs in a cooperative manner with other connected-and-sensing vehicles.

FIG. 1 illustrates an example system 100 for performing cooperative sensor sharing between traffic participants. A vehicle 102 may include various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle.

The vehicle 102 may be a vehicle driven by a driver with driver assistance features. In other examples, the vehicle may be a semi-autonomous vehicle (AV). These AV or driver assistance features may be supported via received V2X data. The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants may additionally or alternately be used, such as bicycles, scooters, and pedestrians, which may be equipped with V2X technology.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., controllers 104A through 104G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104A may be configured to provide control of engine operating components (e.g., idle control components, fuel delivery components, emissions control components, etc.) and for monitoring status of such engine operating components (e.g., status of engine codes); a body controller 104B may be configured to manage various power control functions such as exterior lighting, interior lighting, keyless entry, remote start, and point of access status verification (e.g., closure status of the hood, doors and/or trunk of the vehicle 102); a radio transceiver controller 104C may be configured to communicate with key fobs, mobile devices, or other local vehicle 102 devices; an autonomous controller 104D may be configured to provide commands to control the powertrain, steering, or other aspects of the vehicle 102; a climate control management controller 104E may be configured to provide control of heating and cooling system components (e.g., compressor clutch, blower fan, temperature sensors, etc.); a global positioning system (GPS) controller 104F may be configured to provide vehicle location information; and a human-machine interface (HMI) controller 104G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 106 in order to receive information with respect to the surroundings of the vehicle 102. In an example, these sensors 106 may include one or more of cameras (e.g., advanced driver assistance system (ADAS) cameras), ultrasonic sensors, radar systems, and/or lidar systems.

A vehicle bus 108 may include various methods of communication available between the vehicle controllers 104, as well as between a TCU 110 and the vehicle controllers 104. As some non-limiting examples, the vehicle bus 108 may include one or more of a vehicle controller area network (CAN), an Ethernet network, and a media-oriented system transfer (MOST) network. Further aspects of the layout and number of vehicle buses 108 are discussed in further detail below.

The TCU 110 may include network hardware configured to facilitate communication between the vehicle controllers 104 and with other devices of the system 100. For example, the TCU 110 may include or otherwise access a transceiver 112 configured to facilitate communication with other vehicles 102 or with infrastructure. The transceiver 112 may include BLE functionality, such as support for operation via LE1M and LE125K. The TCU 110 may be further configured to communicate over various other protocols, such as with a communication network over a network protocol (such as Uu). The TCU 110 may, additionally, be configured to communicate over a broadcast peer-to-peer protocol (such as PC5), to facilitate C-V2X communications with devices such as other vehicles 102. It should be noted that these protocols are merely examples, and different peer-to-peer and/or cellular technologies may be used.

The TCU 110 may include various types of computing apparatus in support of performance of the functions of the TCU 110 described herein. In an example, the TCU 110 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C #, FORTRAN, PASCAL, VISUAL BASIC, PYTHON, JAVASCRIPT, PERL, etc.

The TCU 110 may be configured to include one or more interfaces from which vehicle information may be sent and received. This information can be sensed, recorded, and sent to a cloud server 118. In an example, the cloud server 118 may also include one or more processors (not shown) configured to execute computer instructions, and a storage medium (not shown) on which the computer-executable instructions and/or data may be maintained.

The TCU 110 may be configured to facilitate the collection of connected vehicle data and/or other vehicle information from the vehicle controllers 104 connected to the one or more vehicle buses 108. While a single vehicle bus 108 is illustrated, it should be noted that in many examples, multiple vehicle buses 108 are included, with a subset of the controllers 104 connected to each vehicle bus 108. Accordingly, to access a given controller 104, the TCU 110 may be configured to maintain a mapping of which vehicle buses 108 are connected to which controllers 104, and to access the corresponding vehicle bus 108 for a controller 104 when communication with that particular controller 104 is desired.

The TCU 110 may be further configured to periodically transmit connected messages 120 for reception by other vehicles 102. The position, dimension and heading of a vehicle 102 may be broadcast by the vehicle 102 in the in the connected messages 120. In an example, the frequency of sending the connected messages 120 may be on the order of every ten milliseconds. A V2X radio may be a relatively short-range communications unit (e.g., with a range on the order of one kilometer). In an example, the V2X radio may operate on Cellular V2X (e.g., C-V2X 3GPP). In another example, the V2X radio may operate on Institute of Electrical and Electronics Engineer (IEEE) 802.11p Dedicated Short Range Communication (DSRC). In one example, the connected messages 120 may take the form of BSM messages as described in the SAE standard document J2735. In another example, the connected message 120 may take the form of SDSM messages as described in the SAE standard document J3224.

The TCU 110 may be further configured to receive connected messages 120 from other vehicles 102 or other road entities 122. In an example, the vehicle 102 may be referred to as a host vehicle (HV) and remote vehicles (RV) surrounding the HV may be in communication with the vehicle 102 as road entities 122. In another example, the HV may be in communication with other road entities 122, such as bicyclists, pedestrians, etc.

The connected messages 120 may include collected information retrieved from the controllers 104 over the vehicle buses 108. In many examples, the collected information data may include information useful for autonomous vehicle operations or driver-assistance vehicle operations. The connected vehicle data information retrieved by the TCU 110 may include, as some non-limiting examples, latitude, longitude, time, heading angle, speed, lateral changes in speed, longitudinal changes in speed, yaw rate, throttle position, brake status, steering angle, headlight status, wiper status, external temperature, turn signal status, vehicle length, vehicle width, vehicle mass, and bumper height. The connected vehicle data information may also include, weather data (such as ambient temperature, ambient air pressure, etc.), traction control status, wiper status, or other vehicle status information (such as the status of exterior vehicle lights, type of vehicle, antilock brake system (ABS) system status, etc.).

The connected messages 120 may also include information with respect to detected road entities 122. For instance, the connected message 120 may indicate information such as location, size, and/or contour of detected road entities 122 along a roadway 130. The connected message 120 may also indicate a type of the road entity 122 (e.g., pedestrian, car, truck, debris, etc.). For instance, a machine learning model may be used to classify the road entity 122 into a plurality of object classifications, and the connected message 120 may indicate the most likely type that the road entity 122 is determined to be (or in other examples, probabilities that the road entity 122 is of various types of road entity 122).

In some examples the road entities 122 may additionally involve communication via one or more roadside units (RSUs) 126. The RSU 126 may be a device with processing capabilities and networking capabilities and may be designed to be placed in proximity of a roadway 130 for use in communicating with the vehicles 102. For instance, the RSU 126 may include hardware configured to communicate over the broadcast peer-to-peer protocol (such as PC5), to facilitate C-V2X communications with the vehicles 102. The RSU 126 may, accordingly, be able to communicate with multiple vehicles 102 along a specific roadway 130 or in a specific area. The RSU 126 may also have wired or wireless backhaul capability to allow for communication with other elements of a traffic control system, via e.g., Ethernet, or cellular connection to the cellular network infrastructure, for example over Uu interface.

The management of sending, receiving, and filtering of connected messages 120 may be handled by a cooperative sensor sharing application 124 executed by the TCU 110. The cooperative sensor sharing application 124 may be configured to perform operations such as comparing SDSMs, suppressing SDSMs with duplicated information, cooperatively dividing sensing space, etc. These aspects are discussed in detail with respect to FIGS. 2-11.

Figure 2:
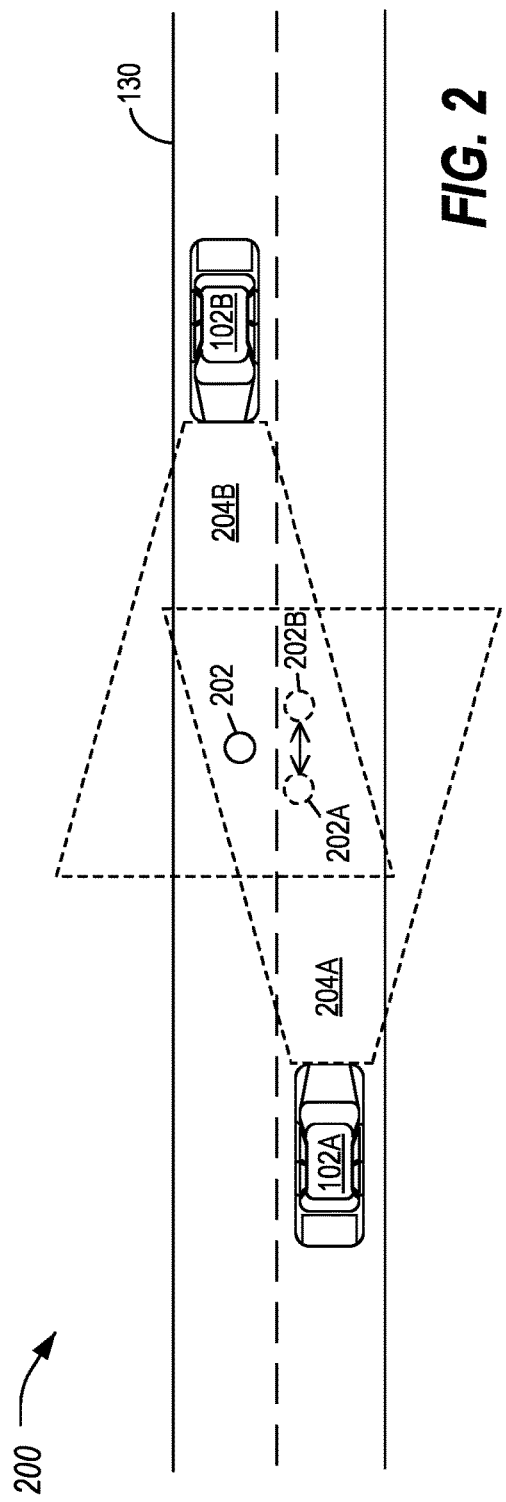
FIG. 2 illustrates an example of connected vehicles each detecting a small object.

FIG. 2 illustrates an example 200 of connected vehicles 102A and 102B each detecting a small object 202. In an example, the small object 202 may be a type of road entity 122 such as a pedestrian. In another example, the small object 202 may be debris.

Each of the connected vehicles 102A, 102B may have respective sensing envelopes 204. As shown, the sensing envelope 204 for the connected vehicle 102A is illustrated as sensing envelope 204A, while the sensing envelope 204 for the connected vehicle 102B is illustrated as sensing envelope 204B. Generally, a sensing envelope 204 is a region around a connected vehicle 102 that uses onboard sensors 106 to reliably detect the objects 202 and that transmits connected messages 120 based on what is detected. Detection of the object 202 within the sensing envelope 204 may include detection of aspects of the object 202, such as the type, size, and/or position. It should be noted that the capabilities of vehicles 102 may vary, and not all connected vehicles 102 may have sensors 106 to detect the same objects 202.

As shown, each of the connected vehicles 102A, 102B detects the object 202. However, these detections are not identical. The position of the small object 202 as detected by the connected vehicle 102A is shown at a first location as object 202A. The non-overlapping position of the small object 202 as detected by the connected vehicle 102B is shown at a second, different location as object 202B.

Figure 3:
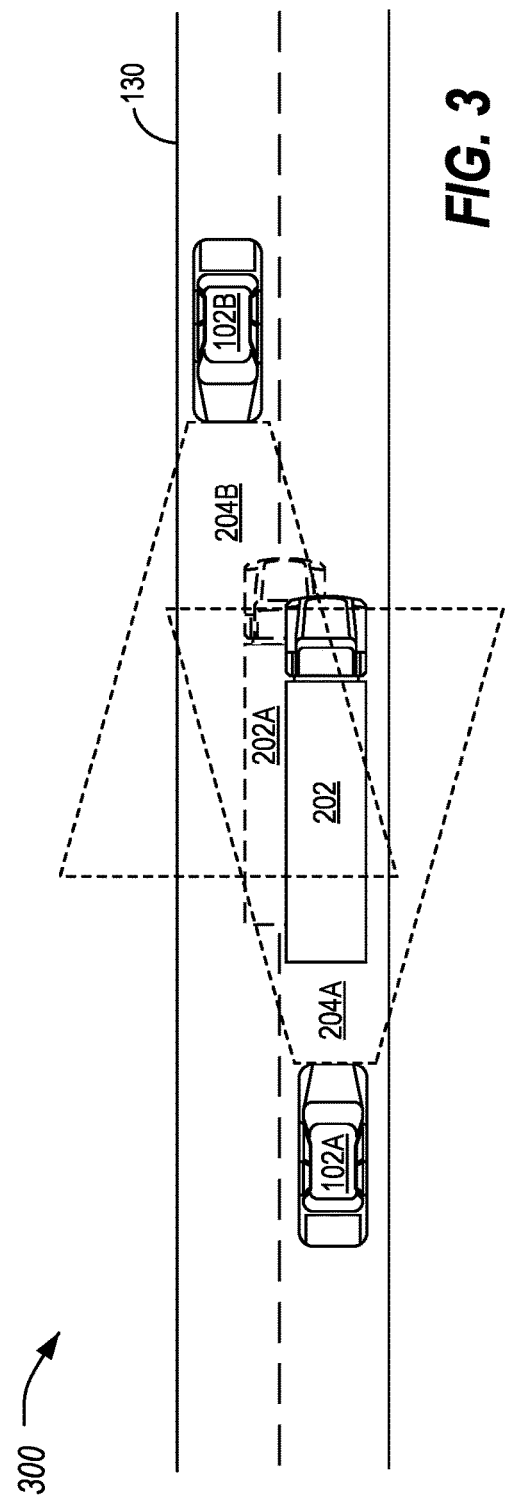
FIG. 3 illustrates an example of connected vehicles each detecting a large object.

FIG. 3 illustrates an example 300 of connected vehicles 102 each detecting a large object 202. In the illustrated example 300, the large object 202 is a type of road entity 122 such as a truck. Similar to as shown in the example 200, the object 202 is detected in the sensing envelope 204A of the connected vehicle 102A. Although the object 202 in this instance is a truck, in the example 300 the truck lacks connectivity and is not treated as a messaging participant.

Referring collectively to FIGS. 2-3, in an example the connected vehicle 102A may broadcasts its perception of the object 202 via one or more SDSM connected messages 120. Responsive to the connected vehicle 102B receiving the SDSM connected message 120 within a predefined interval, the connected vehicle 102B may compare this information against its own perception of the object 202. If the connected vehicle 102B estimates the same object 202 type (vehicle 102, non-vehicle, etc.), approximately the same location of the geometric center of the object 202 (e.g., less than a predefined distance threshold) and, in some examples, overlap of contours of the object 202 if detected, then the connected vehicle 102B may be able to refrain from including the object 202 its own SDSM connected messages 120. Instead, the connected vehicle 102B may suppress its own SDSM transmission with respect to the object 202.

In certain situations, however, the connected vehicle 102B may still transmit SDSM connected messages 120 which duplicate essentially the same object 202 information as that carried by the SDSM connected messages 120 of connected vehicle 102A.

In a first example, the connected vehicle 102B may be aware of other connected vehicles 102 through received connected messages 120 following it that may benefit from being aware of the object 202. Thus, the connected vehicle 102B may continue to send connected messages 120 to overcome hidden terminal situations with following connected vehicles 102.

In a second example, the connected vehicle 102B may determine that the wireless communication channel used for broadcasting SDSM connected messages 120 has a low channel busy percentage (CBP) and so its own SDSM transmission would not cause excessive congestion. In such a case, even if the connected messages 120 of the connected vehicle 102B may be redundant, the sending of such messages would likely not overwhelm network or computing resource of the connected vehicles 102 and may offer additional information with respect to the roadway 130.

In a third example, if the connected vehicle 102B perceives the object 202 as having a different type, estimated size, and/or geometric center than what the connected vehicle 102A defines in its SDSM connected messages 120, then the connected vehicle 102B may still transmit its own SDSM connected message 120 indicative of the size, position, contour, etc. of the object 202 as detected using the sensors 106 of the connected vehicle 102B. In such an example, the connected vehicle 102B may generate a confidence value that defines a correlation from 0% (i.e., distinctly two non-overlapping objects 202) to 100% (i.e., complete overlapping detected object 202) for the object 202 defined in the SDSM connected message 120 from connected vehicle 102A against the perception by the connected vehicle 102B of the object 202.

In a fourth example, the above twin factors of overlap and CBP may be combined by a function that allows the connected vehicle 102B to probabilistically transmit its SDSM connected messages 120 if the connected vehicle 102B is aware of other connected vehicles 102. For example, the probability function may be defined as a decreasing function of CBP and confidence percentage. As shown in equation (1), the probability that the connected vehicle 102B transmits SDSM connected messages 120 given that the connected vehicle 102B has received SDSM connected messages 120 from the connected vehicle 102A may be defined as:

$$100\% - 100x(100 - CBP)/100 * (100 - \text{confidence})/100. \quad (1)$$

In a first example of using equation (1), if CBP=0% and confidence=0%, the SDSM connected messages 120 transmission probability for connected vehicle 102B is set at 100%. In a second example using equation (1), if CBP=0% and confidence=100%, the SDSM connected messages 120 transmission probability for connected vehicle 102B is set at 0%. In a third example using equation (1), if CBP=20% and confidence=80%, the SDSM connected messages 120 transmission probability for connected vehicle 102B is set at 100−100*(1−0.8)(1−0.2)=84%.

FIG. 4 illustrates an example 400 of the connected vehicle 102B suppressing its transmission of connected messages 120 with respect to a detected object 202. As shown, the connected vehicle 102B may receive a connected message 120A from the connected vehicle 102A, where the connected message 120A is descriptive of aspects of the object 202 as detected by the connected vehicle 102A. These aspects may include, for example, the location of the object 202 as detected by the connected vehicle 102A, the size of the object 202 as detected by the connected vehicle 102A, the contour of the object 202 as detected by the connected vehicle 102A, a timestamp of when the connected message 120A was sent, etc.

The connected vehicle 102B, using the sensors 106 of the connected vehicle 102B, may also detect the object 202. Responsive to the detection, the connected vehicle 102B may send or not send a connected message 120B indicating the detection of the object 202. As shown in the example 400, the detection of the object 202 by the connected vehicle 102B is within a distance threshold 402 of the indicated location of the object 202 in the connected message 120A. This may allow the vehicle 102B to determine a high confidence value with respect to the detections of the object 202.

Additionally, the receipt of the connected message 120A may be within a time threshold (not shown) of the detection by the connected vehicle 102B. In this example, as the object 202 is within the distance threshold 402 and also within the time threshold, the perception of the object 202 by the connected vehicle 102B may be considered to overlap with that as defined in the connected message 120A. As a result, the connected vehicle 102B may refrain from sending the connected message 120B including information about the object 202 as detected by the connected vehicle 102B.

FIG. 5 illustrates an example 500 of the connected vehicle 102B performing transmission of connected messages 120 with respect to the detected object 202. Here, as compared to as shown in the example 400, the object 202 as detected by the connected vehicle 102B differs in location by greater than the distance threshold 402 from the location of the object 202 as specified in the connected message 120A. This may allow the connected vehicle 102B to determine a low confidence value with respect to the detections of the object 202. Another possibility could be that the time threshold between detection of the object 202 by the connected vehicle 102B and the receipt of the connected message 120A may be too great. In such examples, assuming the CBP indicates minimal congestion, the connected vehicle 102B may elect to send the connected message 120B including the information about the object 202 as detected by the connected vehicle 102B.

Figure 6:
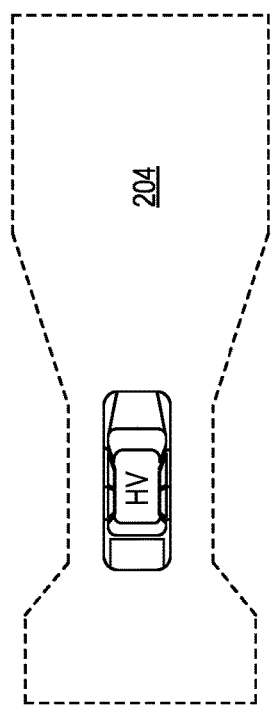
FIG. 6 illustrates an example detail of the sensing envelope of the connected vehicle.

FIG. 6 illustrates an example 600 detail of the sensing envelope 204 of the connected vehicle 102. As shown, the sensing envelope 204 may define an area surrounding the connected vehicle 102, in which the sensors 106 are operable to sense objects 202. This sensing envelope 204 may be defined by the range of the sensors 106 of the vehicle 102, such as the radar, camera, and/or ultrasonic range of the sensors 106.

Figure 7:
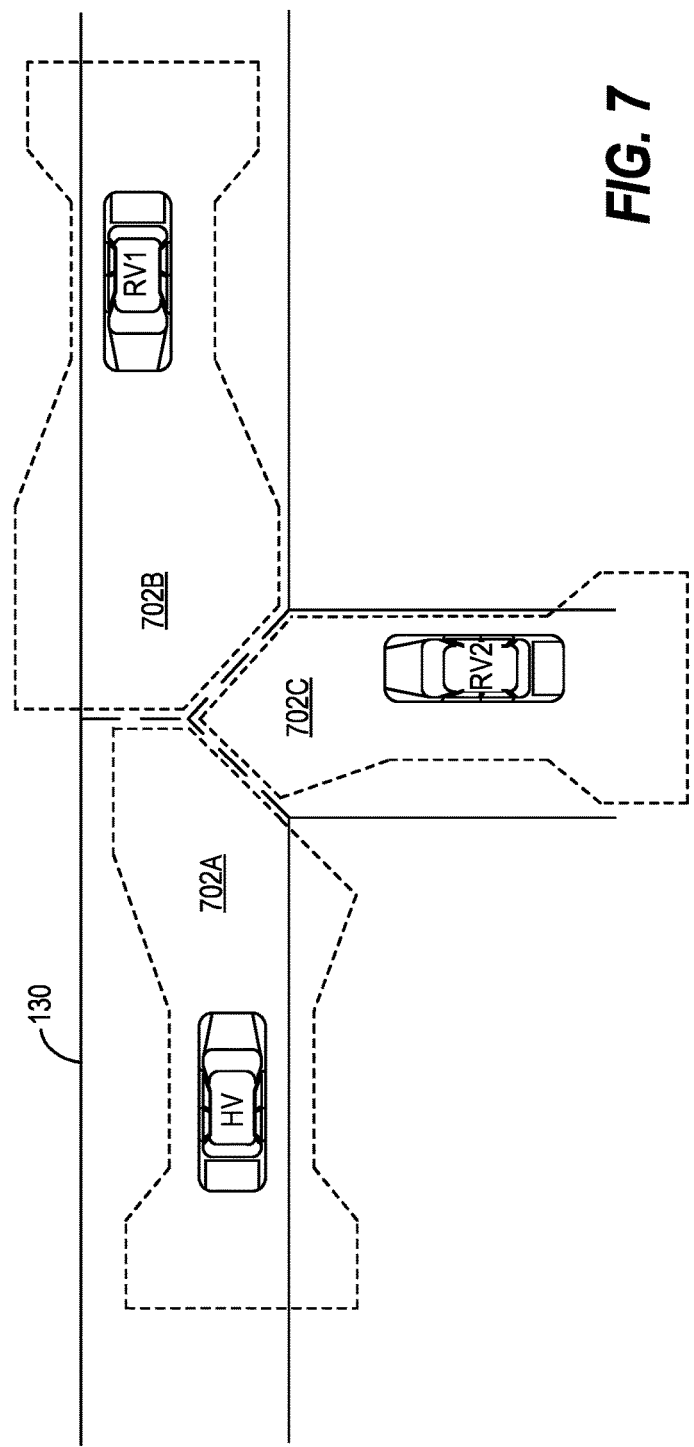
FIG. 7 illustrates an example of a division of sensing load among a plurality of connected vehicles having the sensing envelope as shown in the example.

FIG. 7 illustrates an example 700 of a division of sensing load among a plurality of connected vehicles 102 having the sensing envelope 204 as shown in the example 600. As shown in the example 600, the plurality of connected vehicles 102 includes connected vehicle 102A, connected vehicle 102B, and connected vehicle 102C.

If each of the connected vehicles 102A, 102B, 102C is allowed to utilize its respective sensors 106 to the maximum possible range of its respective sensing envelope 204, then the potential for redundant connected messages 120 may be significant. Thus, a tessellation may be performed to divide the roadway 130 such that each of the connected vehicles 102A, 102B, 102C is responsible for detection of objects 202 in a respective region of the roadway 130. These regions may be non-overlapping in many examples, to limit the potential for connected messages 120 including redundant information about the same object 202.

In an example, a division of sensing space between any pair of connected vehicles 102 may be based on the Voronoi tessellation, where such a vehicle 102 may be assigned to sense within a space closer to it than to any other vehicle 102. Connected vehicles 102 may be assumed to be aware of each other's location based on received connected messages 120 (e.g., BSMs, SDSMs, etc.), which can be utilized to implicitly divide the road space. In an example, each of the vehicles 102 may send connected messages 120 that indicate its location, and/or information indicative of its sensing envelope 204. This information may be received by the vehicles 102, to allow each vehicle 102 to independently perform the tessellation. In another example, a lead vehicle 102 may send a connected message 120 indicating the tessellation to the other vehicles 102.

For instance, given current locations of the connected vehicles 102A, 102B, 102C as shown, the HV connected vehicle 102A may report any detected objects 202 in sensing region 702A, the RV connected vehicle 102B may report any detected objects 202 in sensing region 702B and the RV connected vehicle 102C may report any detected objects 202 in sensing region 702C using a Voronoi tessellation of the roadway 130.

Here, regions 702A, 702B and 702C may be defined based on the Voronoi tessellation. It should be noted that this is only one example, and variations on the tessellation are possible. In an example, a definition of distance for the Voronoi tessellation may include factors other than pure distance. In one possibility, sensitivity of the sensors 106 of the vehicles 102 may be applied as a weight on the distance, such that vehicles 102 with more accurate sensors 106 are given larger sensing regions 702.

In another example, the contours of the sensing envelopes 204 of the respective connected vehicles 102 are accounted for, such that a connected vehicle 102 that is further away but that has coverage of inside its sensing envelope 204 would be assigned to a connected vehicle 102 over another, closer connected vehicle 102 for which the area is outside the sensing envelope 204. For instance, on a curving roadway 130 or a roadway 130 with gradient, the assigned sensing regions 702 may be adjusted for the sensing envelope 204. A BSM or SDSM connected message 120 transmitted by the connected vehicle 102 be appended with additional information about the sensing envelope 204 of the connected vehicle 102. This information may aid in generating the tessellated space between sensing connected vehicles 102.

Regardless of the specifics of the tessellation, if the HV connected vehicle 102A detects an object 202 in sensing regions 702B or 702C then the connected vehicles 102A may refrain from sending any SDSM connected messages 120 related to those detections.

FIGS. 8A-8D collectively illustrate examples of the computation of detection correlation confidence of sensing connected vehicles 102. Each of FIGS. 8A-8D illustrates an object 202, shown as object 202A (e.g., as detected by the connected vehicle 102A, not shown) and as object 202B (e.g., detected by connected vehicle 102B, not shown).

One example approach to defining a correlation confidence (C) of two sensing vehicles 102 is the effective percentage area of overlap of a detected object 202 (here, between that of objects 202A and 202B), divided by the sum of the areas of the objects 202A-B as detected by the two connected vehicles 102. This may be shown, for example, in equation (2) as follows:

$$C(\%) = 200 * AreaOverlap_{AB} / (ObjectArea_A + Object\_Area_B) = \qquad (2)$$
$$200 * c / (a + b).$$

Figure 8A:
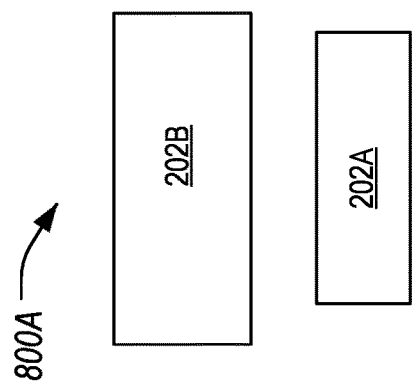
FIG. 8A illustrates a first example of the computation of detection correlation confidence of sensing connected vehicles.
Figure 8B:
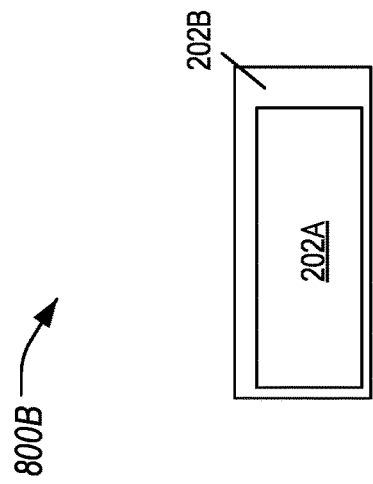
FIG. 8B illustrates a second example of the computation of detection correlation confidence of sensing connected vehicles.
Figure 8C:
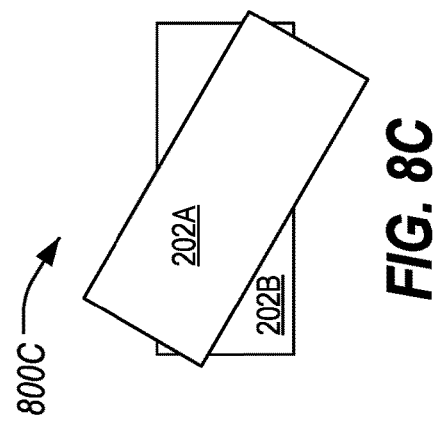
FIG. 8C illustrates a third example of the computation of detection correlation confidence of sensing connected vehicles.
Figure 8D:
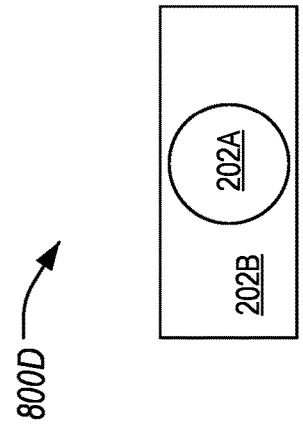
FIG. 8D illustrates a fourth example of the computation of detection correlation confidence of sensing connected vehicles.

Referring to FIG. 8A, there is no overlap between the detected objects 202A and 202B. Accordingly, in this example the correlation confidence C is 0%. Referring to FIG. 8B, there is complete overlap between the detected objects 202A and 202B. Accordingly, in this example the correlation confidence C is 100%. Referring to FIG. 8C, there is partial overlap and a similar detected shape between the detected objects 202A and 202B. Accordingly, in this example the correlation confidence C is approximately 50%. Referring to FIG. 8D, with very different estimated shapes but complete overlap and with the estimate of the detected object 202A at one-third of the estimate of the detected object 202B, there is overlap of approximately 33% of the area between the detected object 202A and object 202B. Accordingly, in this example the correlation confidence C is 33%.

Figure 9:
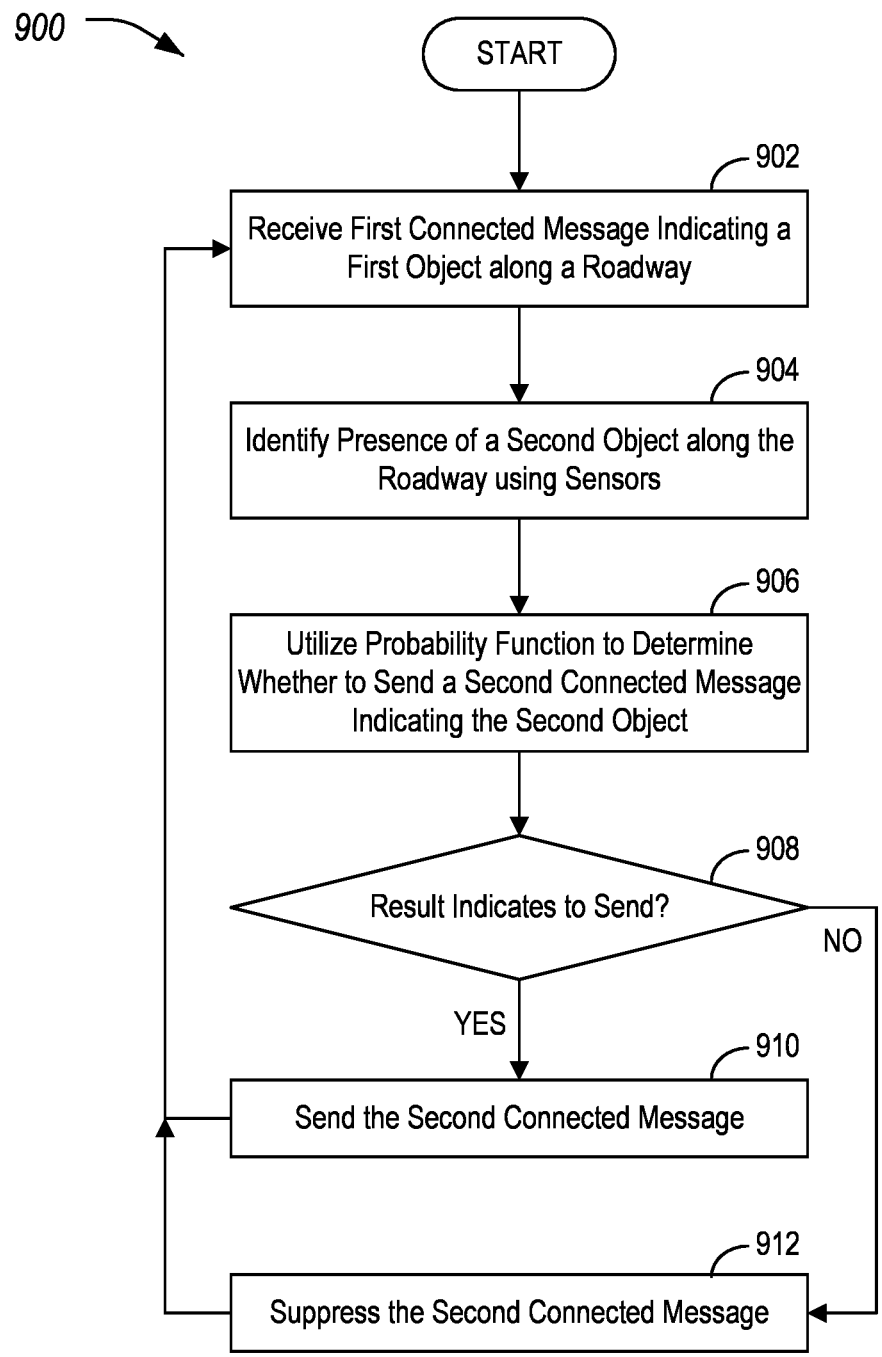
FIG. 9 illustrates aspects of an example process for performing cooperative sensor sharing between traffic participants.

FIG. 9 illustrates aspects of an example process 900 for performing cooperative sensor sharing between road entities 122. In an example, the process 900 may be performed by the vehicles 102 executing the cooperative sensor sharing application 124.

At operation 902, the vehicle 102 receives a first connected message 120 indicating a first object 202 in the roadway 130. In an example, the first connected message 120 may be a SDSM connected message 120 received to the vehicle 102 from a RV.

At operation 904, the vehicle 102 identifies presence of a second object 202 along the roadway 130. The object 202 may be identified using the sensors 106 of the vehicle 102. In an example, aspects of the object 202, such as location, size, and contour, may be determined using the sensors 106.

At operation 906, the vehicle 102 utilizes a probability function to determine whether to send a second connected message 120 indicating the second object 202. In an example, a probability function such as that in equation (1), may be used to determine a result indicative of whether the connected vehicle 102 should transmits the second connected message 120 having received the first connected message 120. The probability function may account for factors such as CBP and confidence. Confidence may be computed, in an example, as shown in FIGS. 8A-8D.

In an example, the probability function is a decreasing function of CBP and confidence percentage that the first and second objects 202 correspond to the same object 202. In an example, the first connected message 120 indicates a first area of the first object 202, the sensors 106 indicate a second area of the second object 202, and the confidence percentage is computed as a percentage area of overlap of the first and second areas divided by a sum of the first and second areas. In an example, the first connected message 120 indicates a first location of the first object 202, the sensors 106 indicate a second location of the second object 202, and the probability function indicates the result to send the second connected message 120 responsive to a distance between the first location and the second location exceeding a distance threshold 402.

Variations on the probability function may be performed. For instance, the vehicle 102 may override the result and send the second connected message 120 responsive to the vehicle 102 indicating presence of a second remote vehicle 102, wherein the vehicle 102 is between the remote vehicle 102 and the second remote vehicle 102. In another example, as discussed in FIG. 10, a tessellation may be performed to divide the sensing space as a further aspect to filtering connected messages 120.

At operation 908, the vehicle 102 determines whether the result of the probability defunction indicates to send the second connected message 120. If so, control passes to operation 910 to send the second connected message 120. If not, control passes to operation 912 to suppress the sending of the second connected message 120. After operations 910 or 912, the process 900 may return to operation 902 to process additional connected messages 120.

Figure 10:
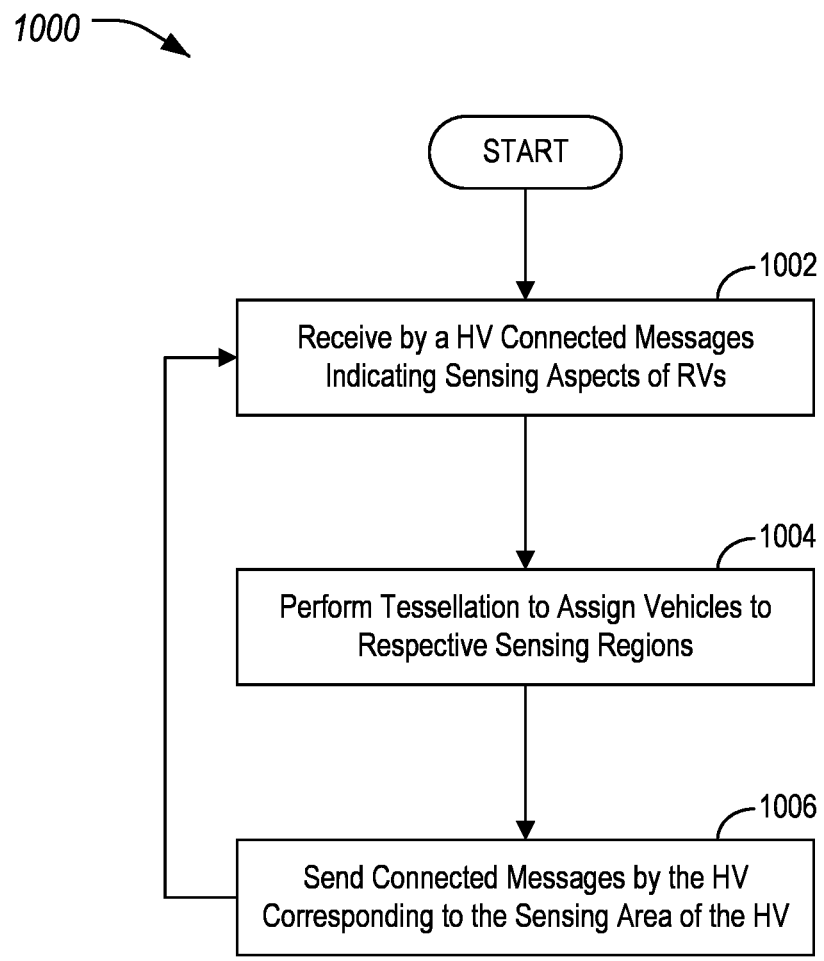
FIG. 10 illustrates further aspects of an example process for performing cooperative sensor sharing between traffic participants.

FIG. 10 illustrates additional aspects of an example process 1000 for performing cooperative sensor sharing between road entities 122. In an example, as with the process 900, the process 1000 may be performed by the vehicles 102 executing the cooperative sensor sharing application 124. As shown, the process 1000 is described from the perspective of a HV in communication with a plurality of RVs.

At operation 1002, the vehicle 102 receives connected messages 120 indicating sensing aspects of a plurality of RVs. In an example, the connected vehicles 102 may be assumed to be aware of each other's location based on received connected messages 120 (e.g., BSMs, SDSMs, etc.). For instance, each of the vehicles 102 may send connected messages 120 that indicate its location, and/or information indicative of its sensing envelope 204. This information may be received by the HV (as well as by the other vehicles 102), to allow each vehicle 102 to independently perform the tessellation. In another example, a lead vehicle 102 may send a connected message 120 indicating the tessellation to the other vehicles 102.

At operation 1004, the vehicle 102 performs a tessellation assigning vehicles 102 to respective sensing regions 702. In an example, a division of sensing space between any pair of connected vehicles 102 may be based on the Voronoi tessellation, where such a vehicle 102 may be assigned to sense within a space closer to it than to any other vehicle 102. For instance, a definition of distance for the Voronoi tessellation may include factors other than pure distance. In one possibility, sensitivity of the sensors 106 of the vehicles 102 may be applied as a weight on the distance, such that vehicles 102 with more accurate sensors 106 are given larger sensing regions 702. In another example, the contours of the sensing envelopes 204 of the respective connected vehicles 102 may be accounted for, such that a connected vehicle 102 that is further away but that has coverage of inside its sensing envelope 204 would be assigned to a connected vehicle 102 over another, closer connected vehicle 102 for which the area is outside the sensing envelope 204.

At operation 1006, the vehicle 102 sends connected messages 120 corresponding to the sensing regions 702 assigned to the vehicle 102 via the tessellation. In an example, responsive to the vehicle 102 detecting an object 202 in its sensing regions 702, the vehicle 102 may send connected messages 120 descriptive of that object 202. In another example, responsive to the vehicle 102 detecting an object 202 in a sensing region 702 of another of the vehicles 102, the vehicles 102 may refrain from sending any connected messages 120 related to that detection. After operation 1006, the process 1000 may return to operation 1002 to process additional connected messages 120.

It should be noted that, in many examples, operations of the processes 900-1000 may be performed continuously in a loopwise manner. It should also be noted that one or more of the operations of the processes 900-1000 may be executed concurrently, and/or out of order from as shown in the process 900-1000.

Thus, the cooperative sensor sharing application 124 may be utilized to cooperatively combine sensing from multiple vehicles 102, without information duplication. Moreover, while sensor 106 data may be shared in connected messages 120, the cooperative sensor sharing application 124 may prevent an excessive increase in wireless channel congestion (e.g., CBP), enabling multiple vehicles 102 to cooperatively share data in an efficient manner.

Figure 11:
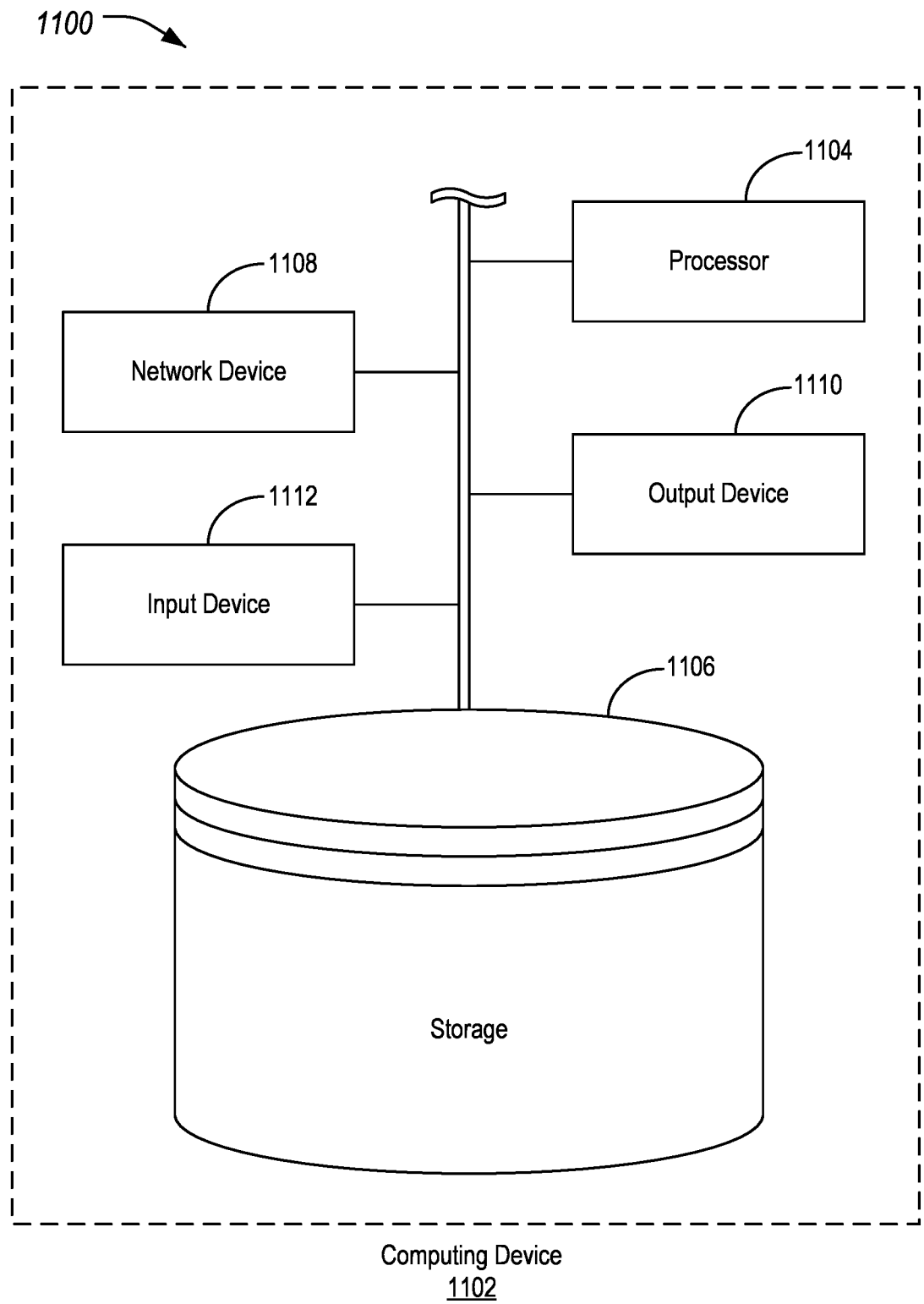
FIG. 11 illustrates an example of a computing device for use in performing cooperative sensor sharing between traffic participants.

FIG. 11 illustrates an example 1100 of a computing device 1102 for use in performing cooperative sensor sharing between road entities 122. Referring to FIG. 11, and with reference to FIGS. 1-10, the vehicles 102, controllers 104, TCU 110, transceivers 112, processors 114, road entities 122, and RSUs 126 may be examples of such computing devices 1102. As shown, the computing device 1102 includes a processor 1104 that is operatively connected to a storage 1106, a network device 1108, an output device 1110, and an input device 1112. It should be noted that this is merely an example, and computing devices 1102 with more, fewer, or different components may be used.

The processor 1104 may include one or more integrated circuits that implement the functionality of a central processing unit (CPU) and/or graphics processing unit (GPU). In some examples, the processors 1104 are a system on a chip (SoC) that integrates the functionality of the CPU and GPU. The SoC may optionally include other components such as, for example, the storage 1106 and the network device 1108 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 1104 executes stored program instructions that are retrieved from the storage 1106, such as those of the cooperative sensor sharing application 124. The stored program instructions, accordingly, include software that controls the operation of the processors 1104 to perform the operations described herein. The storage 1106 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100. Examples of data stored to the storage 1106 may include data from the sensors 106 and the connected messages 120.

The GPU may include hardware and software for display of at least two-dimensional (2D) and optionally three-dimensional (3D) graphics to the output device 1110. The output device 1110 may include a graphical or visual display device, such as an electronic display screen, projector, printer, or any other suitable device that reproduces a graphical display. As another example, the output device 1110 may include an audio device, such as a loudspeaker or headphone. As yet a further example, the output device 1110 may include a tactile device, such as a mechanically raiseable device that may, in an example, be configured to display braille or another physical output that may be touched to provide information to a user.

The input device 1112 may include any of various devices that enable the computing device 1102 to receive control input from users. Examples of suitable input devices that receive human interface inputs may include keyboards, mice, trackballs, touchscreens, voice input devices, graphics tablets, and the like.

The network devices 1108 may each include any of various devices that enable the vehicles 102, road entities 122, and cloud server 118 to send and/or receive data from external devices over networks. Examples of suitable network devices 1108 include an Ethernet interface, a Wi-Fi transceiver, a cellular transceiver, or a BLUETOOTH or Bluetooth Low Energy (BLE) transceiver, an ultra wideband (UWB) transceiver or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, case of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for cooperate sensor sharing, comprising:
a transceiver of a host vehicle;
sensors of the host vehicle; and
a controller of the host vehicle, programmed to
receive a first connected message from a remote vehicle via the transceiver, the first connected message indicating a first object along a roadway detected by the remote vehicle,
identify presence of a second object along the roadway using the sensors,
utilize a probability function to determine a result indicative of whether to send a second connected message indicating the second object, wherein the probability function is a decreasing function of channel busy percentage (CBP) and confidence percentage that the first and second objects correspond to the same object, such that increasing CBP and/or increasing confidence percentage results in decreasing likelihood to send the second connected message,
send the second connected message responsive to the result indicating to send the second connected message, and
suppress the second connected message responsive to the result indicating not to send the second connected message.

2. The system of claim 1, wherein the first connected message indicates a first area of the first object, the sensors indicate a second area of the second object, and the confidence percentage is computed as a percentage area of overlap of the first and second areas divided by a sum of the first and second areas.

3. The system of claim 1, wherein the first connected message indicates a first location of the first object, the sensors indicate a second location of the second object, and the probability function indicates the result to send the second connected message responsive to a distance between the first location and the second location exceeding a distance threshold.

4. The system of claim 1, wherein the controller is further programmed to override the result and send the second connected message responsive to the host vehicle indicating presence of a second remote vehicle, wherein the host vehicle is between the remote vehicle and the second remote vehicle.

5. A system for cooperate sensor sharing, comprising:
a transceiver of a host vehicle;
sensors of the host vehicle; and
a controller of the host vehicle, programmed to
receive connected messages from a plurality of remote vehicles, the connected messages including information indicative of locations of the remote vehicles;
identify presence of an object along the roadway using the sensors,
perform a tessellation to assign the host vehicle and each of the plurality of remote vehicles to the locations closer to the respective vehicle than to any other vehicle;
send a second connected message indicating the object responsive to the host vehicle being closest to a location of the object than any of the plurality of remote vehicles; and
suppress the second connected message responsive to the host vehicle not being the closest.

6. The system of claim 5, wherein the controller is further programmed to perform the tessellation using a Voronoi tessellation.

7. The system of claim 5, wherein the connected messages from the plurality of remote vehicles includes information indicative of sensing envelopes of the remote vehicles, and the tessellation is performed such that such that the plurality of remote vehicles are assigned to the locations that are both closer to the respective vehicle than to any other vehicle and also within the sensing envelope of the respective vehicle.

8. A method for cooperate sensor sharing, comprising:
receiving, by a controller of a host vehicle, a first connected message from a remote vehicle via a transceiver of the host vehicle, the first connected message indicating a first object along a roadway detected by the remote vehicle;
identifying presence of a second object along the roadway using sensors of the host vehicle;
utilizing a probability function to determine a result indicative of whether to send a second connected message indicating the second object, wherein the probability function is a decreasing function of channel busy percentage (CBP) and confidence percentage that the first and second objects correspond to the same object, such that increasing CBP and/or increasing confidence percentage results in decreasing likelihood to send the second connected message;

sending the second connected message responsive to the result indicating to send the second connected message; and suppressing the second connected message responsive to the result indicating not to send the second connected message.

9. The method of claim 8, wherein the first connected message indicates a first area of the first object, the sensors indicate a second area of the second object, and the confidence percentage is computed as a percentage area of overlap of the first and second areas divided by a sum of the first and second areas.

10. The method of claim 8, wherein the first connected message indicates a first location of the first object, the sensors indicate a second location of the second object, and the probability function indicates the result to send the second connected message responsive to a distance between the first location and the second location exceeding a distance threshold.

11. The method of claim 8, further comprising overriding the result and sending the second connected message responsive to the host vehicle indicating presence of a second remote vehicle, wherein the host vehicle is between the remote vehicle and the second remote vehicle.

12. A method for cooperate sensor sharing, comprising:
receiving, by a controller of a host vehicle via a transceiver of the host vehicle, connected messages from a plurality of remote vehicles, the connected messages including information indicative of locations of the remote vehicles;
identifying presence of an object along a roadway using sensors of the host vehicle;
performing a tessellation to assign the host vehicle and each of the plurality of remote vehicles to respective sensing regions, where each respective vehicle is assigned locations closer to the respective vehicle than to any other vehicle;
sending a second connected message indicating the object responsive to the host vehicle being closest to a location of the object than any of the plurality of remote vehicles; and
suppressing the second connected message responsive to the host vehicle not being the closest.

13. The method of claim 12, further comprising performing the tessellation using a Voronoi tessellation.

14. The method of claim 12, wherein the connected messages from the plurality of remote vehicles includes information indicative of sensing envelopes of the remote vehicles, and the tessellation is performed such that such that the plurality of remote vehicles are assigned to the locations that are both closer to the respective vehicle than to any other vehicle and also within the sensing envelope of the respective vehicle.

15. A non-transitory computer-readable medium comprising instructions for cooperative sensor sharing that, when executed by a controller of a host vehicle, cause the host vehicle to perform operations including to:
receive, by the controller, a first connected message from a remote vehicle via a transceiver of the host vehicle, the first connected message indicating a first object along a roadway detected by the remote vehicle;
identify presence of a second object along the roadway using sensors of the host vehicle;
utilize a probability function to determine a result indicative of whether to send a second connected message indicating the second object, wherein the probability function is a decreasing function of channel busy percentage (CBP) and confidence percentage that the first and second objects correspond to the same object, such that increasing CBP and/or increasing confidence percentage results in decreasing likelihood to send the second connected message;
send the second connected message responsive to the result indicating to send the second connected message; and
suppress the second connected message responsive to the result indicating not to send the second connected message.

16. The non-transitory computer-readable medium of claim 15, wherein the first connected message indicates a first area of the first object, the sensors indicate a second area of the second object, and the confidence percentage is computed as a percentage area of overlap of the first and second areas divided by a sum of the first and second areas.

17. The non-transitory computer-readable medium of claim 15, wherein the first connected message indicates a first location of the first object, the sensors indicate a second location of the second object, and the probability function indicates the result to send the second connected message responsive to a distance between the first location and the second location exceeding a distance threshold.

18. The non-transitory computer-readable medium of claim 15, further comprising instructions that, when executed by the controller, cause the host vehicle to perform operations including to override the result and sending the second connected message responsive to the host vehicle indicating presence of a second remote vehicle, wherein the host vehicle is between the remote vehicle and the second remote vehicle.

19. A non-transitory computer-readable medium comprising instructions for cooperative sensor sharing that, when executed by a controller of a host vehicle, cause the host vehicle to perform operations including to:
receive connected messages from a plurality of remote vehicles, the connected messages including information indicative of locations of the remote vehicles;
identify presence of an object along the roadway using the sensors,
perform a tessellation to assign the host vehicle and each of the plurality of remote vehicles to the locations closer to the respective vehicle than to any other vehicle;
send a second connected message indicating the object responsive to the host vehicle being closest to a location of the object than any of the plurality of remote vehicles; and
suppress the second connected message responsive to the host vehicle not being the closest.

20. The non-transitory computer-readable medium of claim 19, wherein the tessellation is performed using a Voronoi tessellation.

21. The non-transitory computer-readable medium of claim 19, wherein the connected messages from the plurality of remote vehicles includes information indicative of sensing envelopes of the remote vehicles, and the tessellation is performed such that such that the plurality of remote vehicles are assigned to the locations that are both closer to the respective vehicle than to any other vehicle and also within the sensing envelope of the respective vehicle.

* * * * *